United States Patent
Lieven

(10) Patent No.: US 8,453,396 B2
(45) Date of Patent: Jun. 4, 2013

(54) WATER-RESIST MEANS FOR AIRCRAFT WINDOWS

(75) Inventor: Patrick Lieven, Fronton (FR)

(73) Assignee: Airbus Operations S.A.S., Toulouse (FR)

( * ) Notice: Subject to any disclaimer, the term of this patent is extended or adjusted under 35 U.S.C. 154(b) by 602 days.

(21) Appl. No.: 12/625,891

(22) Filed: Nov. 25, 2009

(65) Prior Publication Data

US 2010/0127126 A1 May 27, 2010

(30) Foreign Application Priority Data

Nov. 27, 2008 (FR) .................................. 08 58050

(51) Int. Cl.
*E06B 7/00* (2006.01)

(52) U.S. Cl.
USPC ..................................................... 52/204.591

(58) Field of Classification Search
USPC ..................................................... 52/204.591
See application file for complete search history.

(56) References Cited

U.S. PATENT DOCUMENTS

| 3,759,004 A | 9/1973 | Kent | |
| 3,953,630 A * | 4/1976 | Roberts et al. ................. | 428/38 |
| 4,441,755 A * | 4/1984 | Endo et al. ...................... | 296/93 |
| 4,502,259 A * | 3/1985 | Smith ............................... | 52/208 |
| 4,765,673 A | 8/1988 | Frabotta et al. | |
| 4,858,988 A * | 8/1989 | Morgan et al. ................ | 296/201 |
| 6,179,940 B1 * | 1/2001 | Escobar-Y-Gamboa et al. ............................... | 156/108 |
| 2005/0002081 A1 * | 1/2005 | Beteille et al. ................ | 359/275 |
| 2010/0020381 A1 | 1/2010 | Legois et al. | |

FOREIGN PATENT DOCUMENTS

| EP | 1300333 A | 4/2003 |
| FR | 2092925 A | 1/1972 |
| FR | 2007052451 * | 3/2008 |
| FR | 2909921 A1 | 6/2008 |

OTHER PUBLICATIONS

French Search Report and Written Opinion dated Jul. 13, 2009.

* cited by examiner

*Primary Examiner* — Mark Wendell
(74) *Attorney, Agent, or Firm* — Ingrassia Fisher & Lorenz P.C.

(57) ABSTRACT

The subject matter of the disclosed embodiments is a device for mounting a window glass including a seal covering a peripheral edge of the window glass and provided with a strip bearing against a peripheral flat of a frame of the window. The seal includes a flange engaging in the recess of the window and is provided with a squeegee lip bearing against the edge of the frame.

12 Claims, 2 Drawing Sheets

WATER-RESIST MEANS FOR AIRCRAFT WINDOWS

BACKGROUND

1. Field

The disclosed embodiments concern an improvement to water-resist means for aircraft window glasses.

2. Brief Description of Related Developments

Aircraft window glasses, notably cockpit side windows and windshields, consist of a stack of glass layers and interlayers of plastic material, notably of polyurethane and polyvinyl butyral (PVB). PVB has good adhesion to glass and high elongation before tearing because of the presence of silicone.

This multilayer assembly is surrounded by a. peripheral seal and disposed in a housing including a frame against which the peripheral seal bears.

In the case of mounting from inside the cockpit, a window press holds the window glass against the frame.

These window glasses and their fixing means are designed to have high water-resistance when the cabin is pressurized in flight and to be able to withstand the differences in behaviour of the materials as a function of temperature and notably differences in dimensional variations, such as expansion and contraction of these materials when exposed to high temperature differences.

To this end, the window glass is not built into the frame but merely bears on the frame at the perimeter of its exterior face.

This type of mounting has the drawback that water can infiltrate between the seal and the frame when the cabin of the aircraft is not pressurized, for example when the aircraft is on the ground in the rain or water trickles over it.

One aspect of the disclosed embodiments is to provide a device for mounting aircraft window glasses that improves their water-resistance.

SUMMARY

The aspects of the disclosed embodiments propose a device for mounting a window glass including a seal covering a peripheral edge of the window glass and provided with a band bearing against a peripheral flat of a frame of the window, which seal includes a flange engaging in the window recess and provided with a squeegee lip bearing against the edge of the frame.

Preferably, the flange has an internal face bearing against a square for assembling the window glass and received in the recess.

Advantageously, the flange and the squeegee lip are adapted to fill a gap between the frame and the square.

More particularly, the seal has a U-profile forming a rabbet receiving the peripheral edge of the window glass.

In one advantageous embodiment the band bearing against the peripheral flat of the frame consists of a branch of the U-profile including sealing lips.

In one particular embodiment the squeegee lip is produced from an upturned annular edge of the flange and bears against the edge of the frame in a plane separate from and intersecting the plane containing the bearing band.

Advantageously, the edge of the frame against which an external face of the squeegee lip bears is splayed.

The disclosed embodiments further concern a seal for a device for mounting a window glass, which includes a U-profile strip adapted to cover a peripheral edge of the window glass and provided with a bearing band adapted to bear against a peripheral flat of a frame of the window, which seal includes a flange extending perpendicularly away from the bearing band from an interior edge of said bearing band.

The flange notably includes an upturned extension provided with a squeegee lip and/or the squeegee lip is formed by a flexible elastic web.

BRIEF DESCRIPTION OF THE DRAWINGS

Other features and advantages of the disclosed embodiments will be better understood on reading the following description of one nonlimiting embodiment of the disclosed embodiments given with reference to the drawings, which show.

DETAILED DESCRIPTION OF THE DISCLOSED EMBODIMENTS

Figure 1:
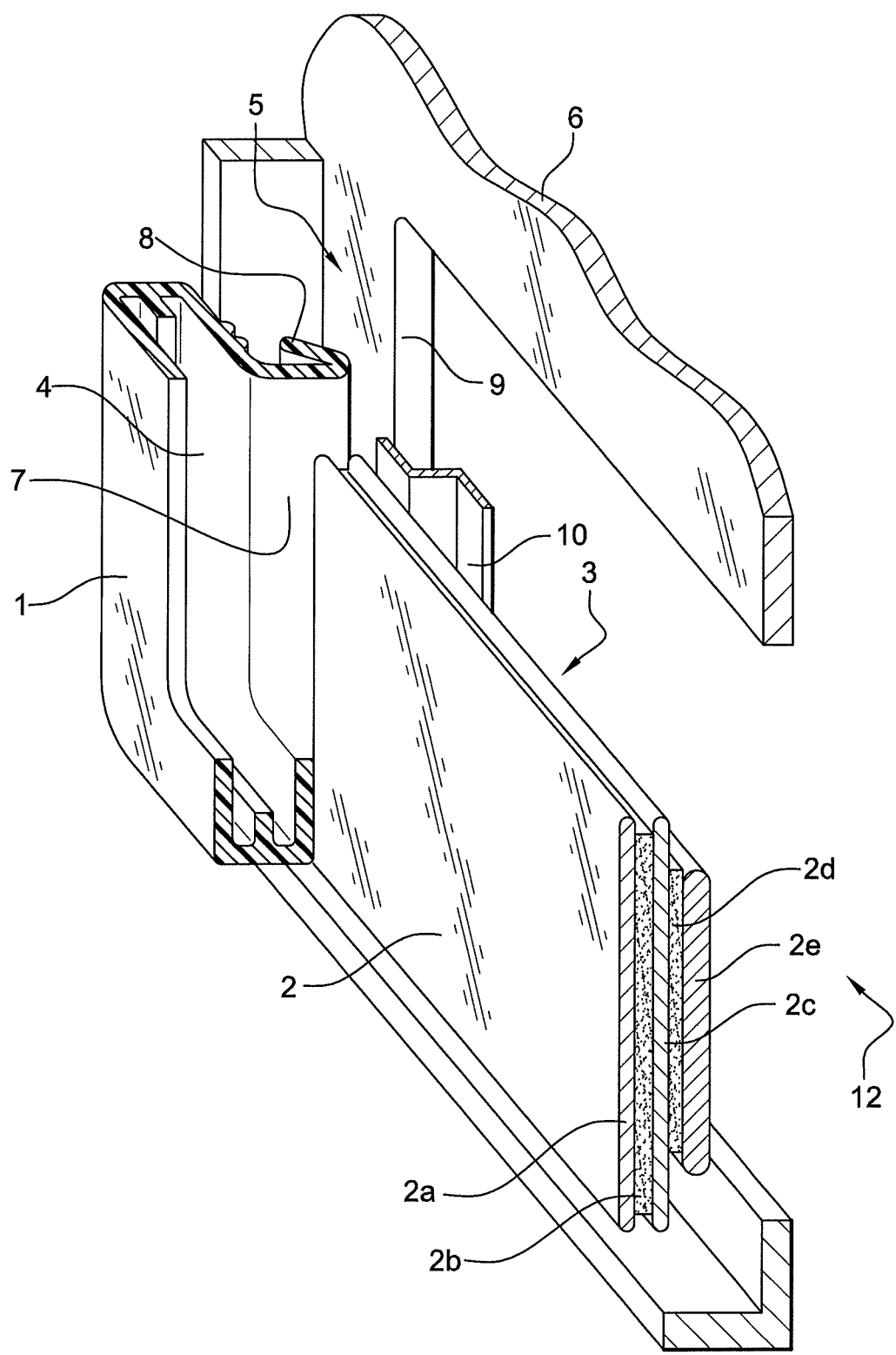
in FIG. 1: a perspective sectional view of elements for mounting a window glass such as an aircraft windshield.

FIG. 1 represents a device for mounting a window glass 2, notably an aircraft windshield.

The window glass 2 is a multilayer window glass of which a glass external layer 2e and a first interlayer 2d are positioned in the recess of the window whereas the internal layers 2a to 2c are wider than the dimensions of the frame of the window, so as to come to bear against an internal surface of the frame, in particular a peripheral flat 5 of the frame of the window.

The device of the disclosed embodiments includes a seal 1 that covers a peripheral edge 3 of the window glass over the whole of the perimeter of the internal layers.

The seal is provided with a band 4 bearing against the peripheral flat 5 of the frame 6 of the window.

In this example, the seal 1 includes a U-profile strip adapted to cover a peripheral edge of the window glass 2.

The strip is provided with a bearing band 4 adapted to be pressed against a peripheral flat 5 of the frame 6 of the window.

The U-profile of the seal forms a rabbet receiving the peripheral edge 3 of the window glass and the band 4 bearing against the peripheral flat 5 of the frame 6 consists of a branch of the U-profile including sealing lips 41 on the outside of the U-profile.

The window glass for its part includes a square 10 reinforcing the connection between the external layers 2d, 2e and the internal layers of the window glass and increasing water-resistance.

The window glass is pressed against the frame by a frame member known in the art and not shown so that the sealing lips oppose the passage of air or water even when the aircraft is not pressurized.

This type of mounting furthermore produces a high resistance when pressurized since as the pressure difference between the interior and the exterior increases the seal bears harder on the perimeter of the frame.

On the other hand, when the aircraft is not pressurized it is necessary to limit the pressure with which the window glass bears on the frame and, especially in the case of large window glasses, the areas of contact between the sealing lips and the peripheral flat of the frame may be locally reduced, which leads to the possibility of water infiltration.

To solve this problem, the seal of the present disclosed embodiments includes a flange 7 engaging in the recess 12 of the window and provided with a squeegee lip 8 bearing against the edge 9 of the frame 6.

The flange 7 carried by the seal 1 extends perpendicularly away from the bearing band 4 from an interior edge of said bearing band.

Figure 2:
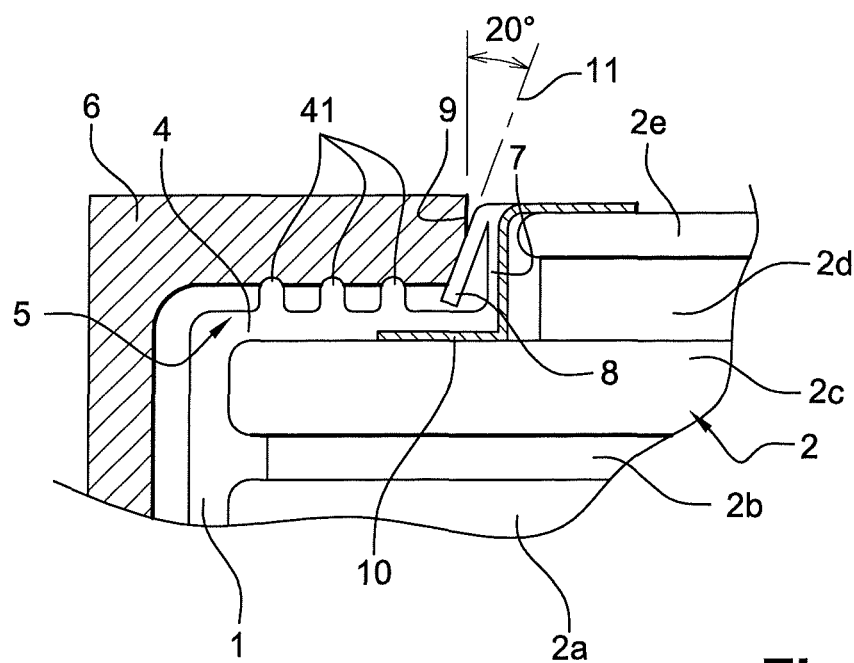
in FIG. 2: a view in section of a detail of one example of a device of the disclosed embodiments for mounting a window glass.

According to FIG. 2, the flange 7 has an internal face bearing against the square 10 for assembling the window glass and received in the recess 12.

Thus the flange 7 and the squeegee lip 8 are adapted to fill a gap between the frame 6 and the square 10 and the flexibility of the squeegee lip takes up any tolerances with regard to the positioning of the window glass relative to the frame.

The squeegee lip 8 is produced from an upturned annular rim of the flange 7 or consists of a barb-section web starting from the free edge of the flange opposite the junction of the flange with the seal.

The squeegee lip, which when unloaded is at an angle from 20 to 45° to the flange, is pressed against the edge 9 of the frame in a plane separate from and intersecting the plane containing the bearing band 4, for example at an angle of 20° to the direction perpendicular to the plane of the band 4 in contact with the peripheral flat of the frame once the squeegee lip has been brought into contact with the edge of the frame.

To increase the area of contact between the external face of the squeegee lip and the edge 9 of the frame, the latter includes a splayed portion identified by its axis 11 against which an external face of the squeegee lip 8 bears.

Apart from the sealing function, the flange 7 and the squeegee lip 8 adapted to fill the gap between the frame and the square surrounding the external layer of the window glass reduce aerodynamic disturbances at the junction between the window and the fuselage, which reduces aerodynamic noise when the aircraft is in flight.

Formed by a flexible elastic web, the squeegee lip 8 is moulded during fabrication of the seal. In the case of production of the seal in an elastomer or silicone-based material, the flexibility and thickness of the squeegee lip are such that it can still be removed from the mould despite its undercut profile.

The disclosed embodiments are not limited to the example shown and in particular the number of sealing lips 41 of the seal can, without departing from the scope of the disclosed embodiments, vary according to the width of the face of the seal bearing against the perimeter of the frame, which is defined by the claims.

The invention claimed is:

1. A device for mounting a window glass, comprising:
   a seal covering a peripheral edge of the window glass and provided with a band for bearing against a peripheral flat of a frame for the window glass, the band including a plurality of sealing lips that extend outwardly from an outer surface of the band and bear against the frame, which seal includes:
   a flange extending perpendicularly from a junction with the band to an upturned annular edge for engaging in a recess of the frame; and
   a squeegee lip extending from the upturned annular edge of the flange toward a plane of the band, the squeegee lip extending away from the upturned annular edge in a single plane separate from and intersecting a plane of the band, the squeegee lip for bearing against an edge of the frame within the recess of the frame.

2. The device according to claim 1, further comprising that the flange has an internal face for bearing against a square for assembling the window glass and for being received in the recess.

3. The device according to claim 2, wherein the flange and the squeegee lip are adapted to fill a gap between the frame and the square.

4. The device according to claim 1 for mounting a window glass wherein the seal has a U-profile forming a rabbet receiving the peripheral edge of the window glass.

5. The device according to claim 4 wherein the band comprises a branch of the U-profile, which includes the plurality of sealing lips.

6. The device according to claim 1 wherein the squeegee lip is angled to bear against a splayed portion of the edge of the frame.

7. The device according to claim 1 wherein the seal includes a U-profile strip adapted to cover the peripheral edge of the window glass.

8. The device according to claim 1, wherein the squeegee lip is formed by a flexible elastic web.

9. The device according to claim 1, wherein the plurality of sealing lips of the band create a gap between the band and the frame.

10. A seal for a device for mounting a window glass comprising:
    a U-profile strip configured to cover a peripheral edge of the window glass;
    a bearing band configured to bear against a peripheral flat of a frame for the window glass, the bearing band including at least one sealing lip extending outwardly from a surface of the bearing band that bears against the frame and the at least one sealing lip creates a gap between the bearing band and the frame;
    a flange extending perpendicularly away from the bearing band from an interior edge of said bearing band to a flange end; and
    a squeegee lip extending from the flange end toward a plane of the bearing band, the squeegee lip extending away from the flange end in a single plane separate from and intersecting the plane of the bearing band.

11. The seal of claim 10 wherein the flange end includes an upturned extension.

12. The seal of claim 10 wherein the squeegee lip comprises a flexible elastic web.

* * * * *